US009967823B2

(12) United States Patent
Basehore et al.

(10) Patent No.: US 9,967,823 B2
(45) Date of Patent: May 8, 2018

(54) AUTOMATIC WAKE TO UPDATE WIRELESS CONNECTIVITY (71) Applicant: Google Inc., Mountain View, CA (US)

(72) Inventors: Derek Basehore, Mountain View, CA (US); Alexandra Levich, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 198 days.

(21) Appl. No.: 14/720,615

(22) Filed: May 22, 2015

(65) Prior Publication Data

US 2016/0345269 A1 Nov. 24, 2016

(51) Int. Cl.
G08C 17/00 (2006.01)
H04W 52/02 (2009.01)
H04W 4/02 (2018.01)
H04W 48/16 (2009.01)
H04W 84/12 (2009.01)
H04W 52/28 (2009.01)
H04W 88/06 (2009.01)
H04W 76/04 (2009.01)

(52) U.S. Cl.
CPC ....... H04W 52/0254 (2013.01); H04W 4/027 (2013.01); H04W 48/16 (2013.01); H04W 52/0258 (2013.01); H04W 52/282 (2013.01); H04W 52/283 (2013.01); H04W 52/285 (2013.01); H04W 76/046 (2013.01); H04W 84/12 (2013.01); H04W 88/06 (2013.01); Y02B 60/50 (2013.01)

(58) Field of Classification Search
None
See application file for complete search history.

(56) References Cited

U.S. PATENT DOCUMENTS

| 7,881,749 | B2 | 2/2011 | Hiles |
| 8,806,378 | B2 | 8/2014 | Schwarzberg et al. |
| 8,855,667 | B2 | 10/2014 | Lada et al. |
| 2011/0171909 | A1 | 7/2011 | Jung et al. |
| 2011/0312286 | A1 | 12/2011 | Lin et al. |
| 2014/0098682 | A1* | 4/2014 | Cao ................... H04W 36/0083 370/252 |

(Continued)

FOREIGN PATENT DOCUMENTS

EP 2315101 B1 1/2014

Primary Examiner — Mohammad Anwar
Assistant Examiner — Angel Brockman
(74) Attorney, Agent, or Firm — McDermott Will & Emery LLP (57) ABSTRACT A computing device updates wireless connectivity information while the device is in an idle state, in expectation of user-interaction. Power is suspended to wireless network circuitry in a mobile device, for example, when the device is in an idle state. On detecting a movement of the mobile device, a location sensor is activated to read a current location of the mobile device while power to the wireless network circuitry is suspended. Based on the current location being a threshold distance from a location determined before power to the wireless network circuitry was suspended, the wireless network circuitry is activated and a current listing of wireless access points near the mobile device is determined without user interaction with the virtual features of the device.

20 Claims, 5 Drawing Sheets (56) References Cited

U.S. PATENT DOCUMENTS

| | | |
|---|---|---|
| 2014/0195839 A1 | 7/2014 | Chueh et al. |
| 2014/0244156 A1* | 8/2014 | Magnusson ............ G01C 21/30 |
| | | 701/418 |
| 2014/0274044 A1 | 9/2014 | Lee et al. |
| 2014/0364104 A1 | 12/2014 | Wood et al. |

* cited by examiner

AUTOMATIC WAKE TO UPDATE WIRELESS CONNECTIVITY

BACKGROUND

Mobile devices (e.g., mobile phones and laptops) include multiple radio hardware, including radio circuitry for WiFi, Bluetooth, and cellular network access. WiFi network circuitry (e.g., wireless network interfaces), even with power saving modes enabled, may consume more energy than the mobile phone's cellular network circuitry. Moreover, the WiFi network circuitry includes a WiFi locator utility, generally implemented by software, which runs in the background and monitors the activity of wireless networks around the device on which it operates. For each detected network it provides information about the network, including service set identifier (SSID) and signal quality. Because the WiFi network circuitry continuously monitors for new WiFi access points, battery life is compromised.

SUMMARY

The subject technology provides a system and computer-implemented method for waking a computing device to update wireless connectivity. In one or more implementations, the method comprises suspending power to wireless network circuitry in a mobile device, the wireless network circuitry configured to communicate with wireless access points for one or more local wireless networks, detecting a movement of the mobile device based on one or more motion sensors in the mobile device, activating, based on the detected movement, a location sensor to read a current location of the mobile device while power to the wireless network circuitry is suspended, and, based on the current location being a threshold distance from a location determined before power to the wireless network circuitry was suspended, activating the wireless network circuitry and determining a current listing of wireless access points near the mobile device. Other aspects include corresponding systems, apparatuses, and computer program products for implementation of the computer-implemented method.

In one or more implementations, the method comprises suspending power to wireless network circuitry in a mobile device, the wireless network circuitry configured to communicate with wireless access points for one or more local wireless networks, detecting a movement of the mobile device based on one or more motion sensors in the mobile device, based on detecting the movement, activating a timer while power to the wireless network circuitry is suspended, and, based on a threshold period of time since the timer was activated, activating the wireless network circuitry and determining a current listing of wireless access points near the mobile device. Other aspects include corresponding systems, apparatuses, and computer program products for implementation of the computer-implemented method.

In one or more implementations, the method comprises suspending power to wireless network circuitry in a mobile device, the wireless network circuitry configured to communicate with wireless access points for one or more local wireless networks, determining a wake up time for the mobile device based on a history of user-interactions with the mobile device, activating, at the determined wake up time, a location sensor to read a current location of the mobile device while power to the wireless network circuitry is suspended, and, based on the current location being a threshold distance from a location determined before power to the wireless network circuitry was suspended, activating the wireless network circuitry and determining a current listing of wireless access points near the mobile device, the wireless network circuitry being activated without user-interaction with the mobile device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Connecting to a wireless local area network (WLAN) requires scanning through a list of WLAN channels. The list of WLAN channels is the set of assignable channels using IEEE (Institute of Electrical and Electronics Engineers) 802.11 protocols. The 802.11 workgroup documents use in distinct frequency ranges, for example, in 2.4 GHz, 3.6 GHz, 4.9 GHz, and 5 GHz bands. Each range is divided into a multitude of channels. In order to connect to a network through an access point, a computing device scans for WLANs within its range and scans the channels of each WLAN. The scanning process determines which channels are active and also determines network identifiers (e.g., SSIDs) associated with the active channels. This scanning is generally performed periodically and each time the computing device attempts to make contact with a WLAN.

The foregoing scanning and determination of network identifiers may introduce a significant amount of delay when a device is first used. The scanning requires a probe request by the computing device, and waiting for the response to the probe request can take approximately 100 milliseconds per device. For example, the scanning can take approximately 4 seconds if there are 40 channels. This amount of time is significant in a wireless-networking environment where associations and re-associations may occur on a frequent and regular basis. The delay problem may be compounded by the computing device's operating system or other WLAN applications, which may request the periodic-comprehensive scans. Moreover, scanning WLAN access points and sending data packets over a wireless connection may consume a significant amount of power. Since these periodic-comprehensive scans may be performed fairly often (e.g., approximately once a minute), they can adversely affect the throughput and/or performance of the computing device and reduce battery life.

The subject technology includes hardware and corresponding protocols for reducing delay when accessing wireless networks while also reducing power consumption by limiting duration that the wireless network circuitry of a computing device is active. A computing device with wireless capabilities is configured with multi-radio hardware, including wireless network circuitry and cellular network circuitry. The wireless network circuitry is configured to communicate with wireless access points for a local wireless network (e.g., using IEEE 802.11 protocol standard). The cellular network circuitry provides mobile communications with cellular providers using a cellular technology (e.g., GSM, CDMA). The wireless network circuitry does not communicate over cellular networks.

Local wireless networks provide network access using a wireless distribution method within a limited area such as a home, school, computer laboratory, or office building. Local wireless networks do not provide cell phone data service. Access to a local wireless network is distributed via a wireless access point such as a wireless router, or base station. The wireless access point broadcasts availability and information about the wireless network, and provides communication with connected wireless devices. Wireless devices may include, for example, computing devices such as laptops, personal digital assistants, IP phones and other smartphones, or fixed devices such as desktops and workstations that are equipped with a wireless network interface.

According to the subject technology, a computing device is equipped with a location sensor such as a GPS and one or more motion sensors including, for example, an accelerometer. According to the disclosure, one or more motion sensors detect a change in physical inertia upon the computing device or a change in the device's orientation. A location sensor detects a location of the device based on some geo-location coordinate system. A motion sensor does not include location sensor and a location sensor does not include a motion sensor. A processor, however, may be adapted to determine a current geo-location based on motion sensed by a motion sensor and a previously detected geo-location. However, a recitation of the term "location sensor" does not by itself include this configuration of the processor and motion sensor, and a recitation of the term "motion sensor" does not by itself include determining motion of a device merely by determining a new geo-location.

The computing device may provide a small amount of constant power to the motion sensor to detect motion of the computing device. However, power to the location sensor and other components of a computing device may be suspended to conserve power while the computing device is idle. The power may be suspended, for example, after a predetermined period of time of inactivity (e.g., 5 minutes). In one implementation, the computing device is configured to, on detecting a threshold amount of movement of the computing device while idle, wake up the location sensor and/or a timer, and perform limited wireless activity as a background process to update the device.

The timer may be part of a sensor hub that operates on a very low power. Once the timer is activated and reaches a threshold period of time since the movement was detected, the location sensor may be activated by the sensor hub to read a position of the computing device. The computing device (e.g., the sensor hub) may store a previous position of the computing device, for example, a position of the device before the power was last suspended. The two positions are compared and, when the current location of the computing device is a threshold distance from the previously stored position, the wireless network circuitry is activated solely to enable WiFi locator software or firmware to determine a current listing of access points near the computing device. In this regard, the wireless network circuitry is activated without activating other components of the computing device, and without sending or receiving data apart from determining access points. For example, the display screen, main processor, and cellular network circuitry may remain in the idle state.

In one or more implementations, the computing device may not rely on a timer before activating the location sensor, and the location sensor may be activated when the threshold amount of movement is detected by the motion sensor. In one or more implementations, the wireless network circuitry may be activated based on predicted behavior of the user. For example, the computing device may detect usage of the device over time, including times of activity and being in an idle state, and store behavior patterns representative of when the device is expected to be activated. During an idle state, the stored behavior patterns may be used to awaken the wireless network circuitry before a predicted use of the device so that applications may download content and updates in expectation of the device being used. In this manner, battery life is preserved and the user experience enhanced by maintaining the device and its applications in an up-to-date state.

Figure 1:
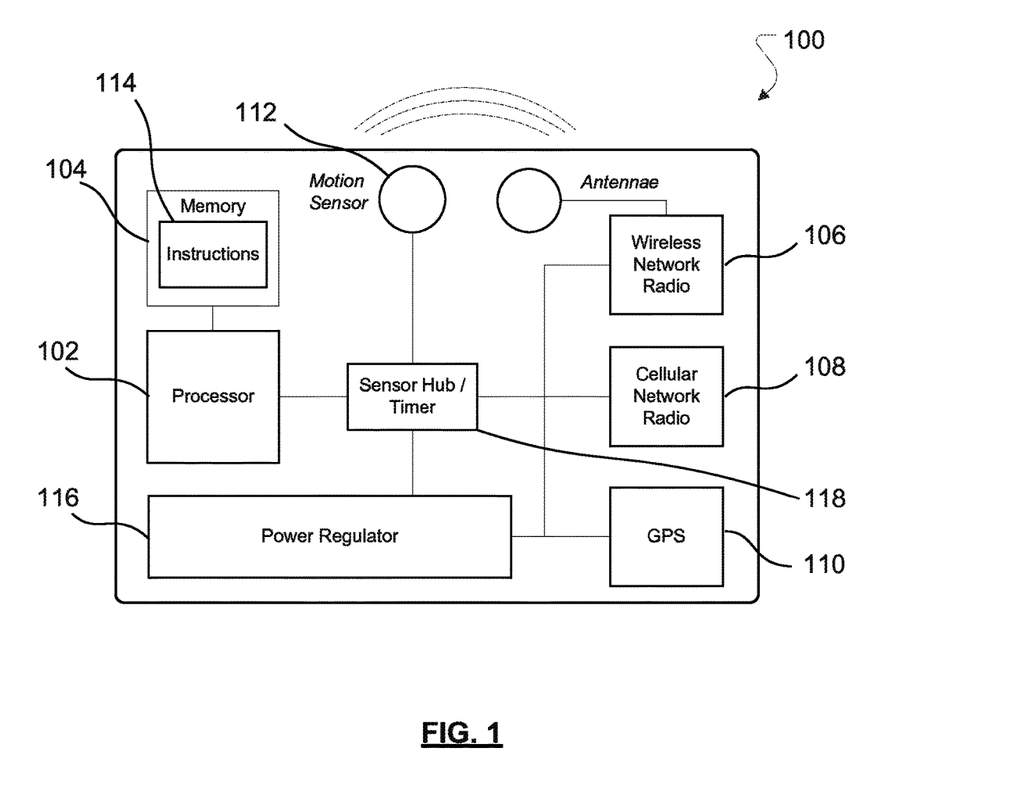
FIG. 1 depicts example computing device, including example components for automatically waking wireless network circuitry.

FIG. 1 depicts example computing device 100, including example components for automatically waking wireless network circuitry, according to one or more aspects of the subject technology. Computing device 100 includes a processor 102, a memory 104, multiple radios 106, 108, 110, and one or more motion sensor devices 112. A motion sensor device 112 may generally refer to any device capable of sensing a physical movement of hardware, including an integrated or connectable accelerometer, gyroscope, a proximity sensor, camera, or the like. As will be described further, motion sensor device 112 may be configured to detect movement of a mobile device that embodies computing device 100 or one or more components thereof.

Processor 102 may execute instructions 114, stored in memory 104, to operate motion sensor devices 112 to movement of computing device 100, and to detect user interactions with computing device and patterns of such user interactions over a period of time. These determined activity patterns may be used to anticipate future interactions between a user and computing device 100 (or a hardware device operably connected thereto), and to further determine whether computing device 100, or the associated hardware, is or should be in an idle state. The patterns of user interactions may then be stored, for example, in memory 104.

Computing device 100 may include several associated or integrated hardware devices including, for example, wireless network circuitry 106 (including, e.g., a wireless network radio), cellular network circuitry 108 (including, e.g., a cellular network radio), a location sensor 110 (e.g., a global positioning system radio), in addition to, for example, a power supply, a display screen, optical media player (Blu-Ray, DVD, CD-ROM, or the like), camera (e.g., webcam), and the like. Each of these hardware devices may be associated with a power consumption.

Computing device 100 may further include a power regulator 116. Power regulator 204 may be implemented as hardware or software. For example, power regulator 116 may be embodied in a power supply operably connected to hardware components for providing power to the components, or may be software (for example, stored on memory 104) that, when executed by processor 102, adjusts (for example, regulates) power supplied to a power supply or other individual hardware components. In this regard, power regulator 116, memory unit 104, and/or a hardware power supply may be a single component or distributed across a group of components. In one example, power regulator 116 instructs a power supply to supply a predetermined or adjusted amount of power to one or more of the hardware components.

Power regulator 116 may determine or provide a power timeout period. For example, the power timeout period may be a time duration that computing device 100 or an associated hardware device may be idle before its power supply is limited (for example, suspended or powered down). For example, on computing device 100 being idle for a period of time greater than the power timeout period, computing device 100 may initiate a suspension or power down of the device's power supply, thereby shutting down other related systems of the device. Which hardware components are selected to be suspended or powered down may, in some aspects, depend on the anticipated user interaction, the time of day, and/or type of programs currently being executed by computing device 100. For example, if computing device 100 is playing audio files, and has been unattended for a period of time, the display screen or WiFi may be suspended on exceeding power timeout periods related to those components, but power to audio systems may be retained.

As will be described in further detail, when computing device 100 enters an idle state, power regulator 116 may limit or turn off power to most components of computing device 100 (e.g., components and applications responsive to user interactions), leaving powered only those components essential for waking computing device 100. For example, power regulator 116 may turn off all components except for motion sensor 112. In one or more implementations, power is retained to processor 102 and memory 104 for operation of motion sensor 112. In some implementations, motion sensor 112 includes a processor and memory, and may be configured to send a wake signal to processor 102. In this regards, processor 102 may be configured to receive the wake signal and wake certain components of computing device 100 according to a predetermined wake configuration (e.g., stored in memory 104).

Periods of time that motion sensors 112 detect use of computing system 112 may be anonymously stored (for example, on memory 104) and analyzed to determine a pattern of user activity. The pattern of activity may include an average length of time that computing device 100 is not in use by a user during a predetermined time of the day. Computing device 100 may include one or more menus for deactivating or opting out of the storage of activity patterns.

In one example, memory 104 may store activity data and/or inactivity data for certain portions of a day or a specific range of time (for example, hours, minutes, or the like) throughout the day. A different pattern of activity may also be associated with different ranges of time. In some aspects, the pattern of activity may be determined for a range of time periods over a number of days. For example, system 100 may determine that, for Monday through Friday, computing device 100 is idle between 11:00 pm and 6:30 am, and idle during the hours of 12:00 pm and 1:00 pm. Computing device 100 may be determined to be idle at different times on Saturdays and Sundays.

Once a pattern of activity has been established (for example, after a predetermined number of periods in which the system is idle), computing device 100 may determine appropriate times to wake certain components of the system during idle times based on the pattern of activity. In one example, based on a stored pattern of activity, computing device 100 may predict that the system will be used at 7:00 am. Computing device 100 may then wake wireless network circuitry 106 to determine whether a previously connected WLAN is still available. Wireless network circuitry 106 may be instructed to attempt to connect to the WLAN using a previously stored network identifier or, if a network identifier is otherwise not available (e.g., not stored or not previously connected to the present WLAN) then wireless network circuitry 106 may scan the WLAN to download a current list of network identifiers for connecting to the WLAN, and then attempt to connect automatically without waking other components of computing device 100. In this regard, computing device 100 may not wake (e.g., provide power to) a cellular network circuitry 108 or display during and after communication with the WLAN.

In one or more implementations, computing device 100, on determining the presence of the user, may anticipate use of computing device 100 by the user and wake wireless network circuitry 106 based on current presence of the user. For example, motion sensors 112 may include a proximity sensor for sensing movement. In this regard, computing device 100 may use the proximity sensor to sense a user moving within a predetermined area of device. Additionally or in the alternative, the user may be sensed from physical movement of computing device 100 or component thereof, for example, via an accelerometer, gyroscope, or other motion sensor 112. On detecting the movement, computing device 100 may wake wireless network circuitry 106 without turning on the display or cellular network circuitry 108. Wireless network circuitry 106 may then be used to discover access points near computing device 102 (e.g., within a range of wireless network circuitry 106). Additionally or in the alternative, wireless network circuitry may be activated to allow applications installed on the computing device to be updated (e.g., by a server push update) before computing device 100 receive interaction from the user.

In one or more implementations, activation of wireless network circuitry 106 may not include scanning of a WLAN unless computing device 100 first determines it is likely that computing device 100 has moved to a new geographic location such that a new scan would be required. For example, if computing device 100 has not moved then computing device 100 may, upon waking, merely connect to a previously connected channel using a previously stored network identifier. However, if computing device 100 has moved a substantial distance from its previous location, such that it is possible to be out of range of the previously connected WLAN, then a new scan may be initiated (e.g., as a background process) to determine new criteria for network access, and/or to receive updates to relevant applications over a corresponding network.

Accordingly, on sensing the movement, computing device 100 may first wake location sensor 110 to determine a current location of the device. If the current location is a threshold distance from a location determined before power to the components (e.g., wireless network circuitry 106) of computing device 100 were suspended then wireless network circuitry 106 may be activated, and a current listing of wireless access points near the mobile device discovered and scanned. Additionally or in the alternative, computing device 102 may be able to determine a distance of movement based on, for example, a calculation including a detected acceleration from an accelerometer (112) over a duration of time. The distance of movement may be further based on the calculation including an orientation during the acceleration of computing device 102 read from a gyroscope (112).

In one or more implementations, computing device 102 may use geofencing to determine the threshold distance. For example, computing device 102 may determine a current coordinate location based on triangulation of known WLANs. The locations of each WLAN and a related geofence may be transmitted by the WLAN or looked up via a remote service (e.g., a server in the cloud). Once the geofence of a particular WLAN is determined, computing device may determine the threshold distance based on its own coordinate location or current signal strength of the WLAN. Whether the device has move outside of the determined geofence (e.g., and thereby meet the threshold distance) may then be determined based on a detected movement from the accelerometer as described above or based on coordinates received from a global positioning system (GPS) 110.

In the depicted example, computing device 102 also includes a sensor hub 118 for controlling motion sensor(s) 112 and various radio circuitries including, for example, wireless network circuitry 106, cellular network circuitry 108, and/or location sensor 110. Sensor hub 118 may include a microprocessor and memory and operate on a very low power so that its corresponding sensors and circuitry may be controlled with lower power than required by processor 102 and its affiliated component circuitry. In this regard, when computing device 100 is idle, power may be conserved by shutting down all powered systems except sensor hub 118 and/or its connected sensors and/or radios. In one or more implementations, sensor hub 118 may include a timing circuit. As will be described further, timer may be activated on detecting the movement, and wireless network circuitry 106 and/or the location sensor 110 may be activated only when the activated timer reaches a threshold period of time since the movement was detected.

In the depicted example, computing device 100 may be operably connected one or more servers over a network. The network may be, for example, a WAN, LAN, or any other network consisting of one or multiple networking technologies (such as satellite, cellular, cable, DSL, optical network, Ethernet over twisted pairs, and others), and which deploys one or multiple networking protocols for transferring data. The network may also include, but is not limited to, any one or more of the following network topologies, including a bus network, a star network, a ring network, a mesh network, a star-bus network, a tree or hierarchical network, and the like. As described above, the network may be accessible via a wireless access point. In this regard, the wireless access point may be configured according to the IEEE 802.11 standards, or use Bluetooth, Bluetooth Low Energy, infrared, IrDA, Wireless USB, or the like.

In some implementations, computing device 100 may be connected via the network to an online community product (e.g., a social network). Accordingly, one or more communications described herein may be transmitted via the online community product or services associated with the product. The various computing devices may also be connected to and/or communicate with each other via the Internet, or a private LAN/WAN. Any of the various connections may be made over a wired or wireless connection.

Figure 2:
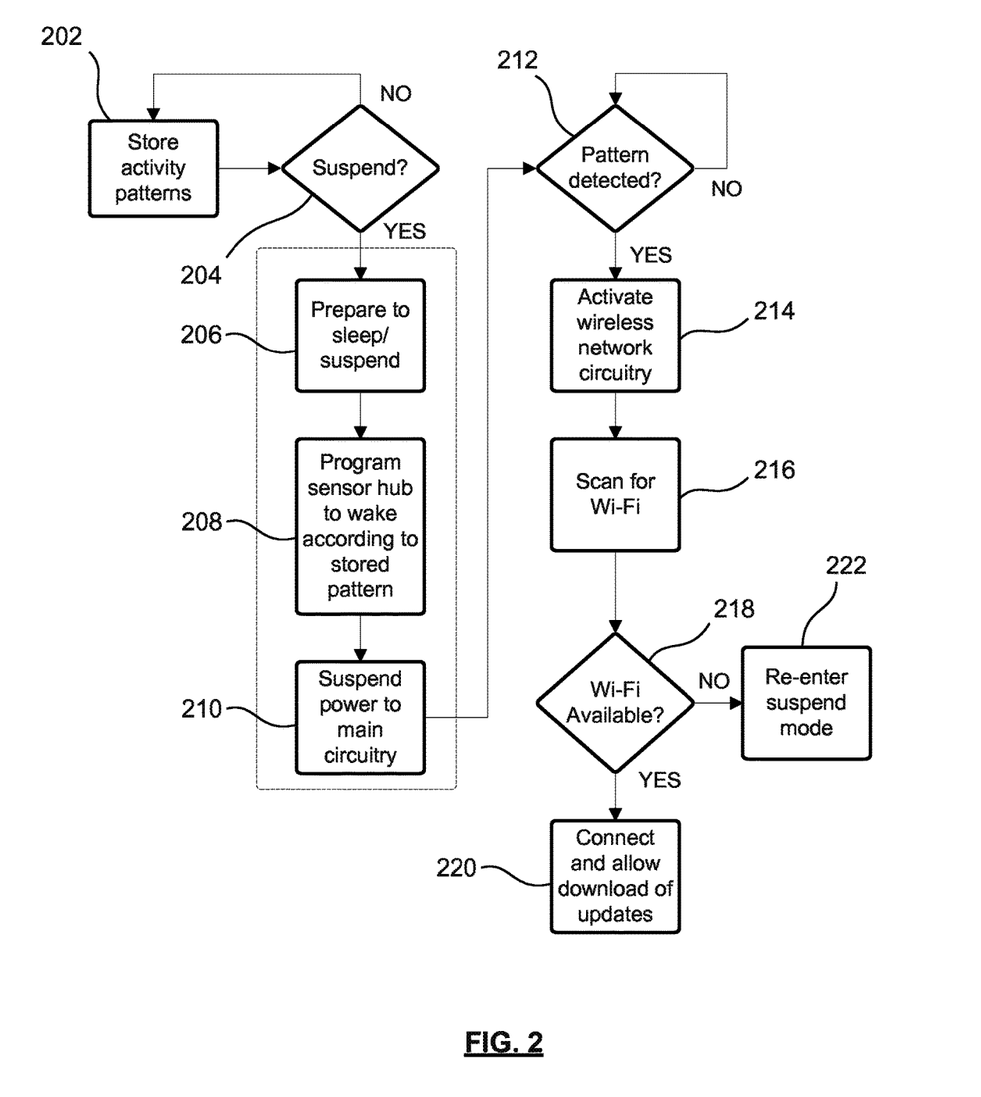
FIG. 2 depicts a flow diagram of a first example process for waking a computing device to update wireless connectivity.

FIG. 2 depicts a flow diagram of a first example process 200 for waking a computing device to update wireless connectivity, according to aspects of the subject technology. For explanatory purposes, example process 200 is described herein with reference to the components of FIG. 1. Further for explanatory purposes, the blocks of example process 200 are described herein as occurring in serial, or linearly. However, multiple blocks of example process 200 may occur in parallel. In addition, the blocks of example process 200 need not be performed in the order shown and/or one or more of the blocks of example process 200 need not be performed.

In the depicted example flow diagram, computing device 100 stores device activity patterns corresponding to device use over a period of time (202). Computing device 100 does not necessarily store copies or descriptions of actual user interactions (or user information associated with the interactions) but, rather, anonymous information that may be collected from such interactions. Computing device 100 may include one or more menus for deactivating or opting out of the storage of such information.

Accordingly, computing device 100 may store times when the device goes idle and for how long, when the device is activated manually by user interaction, applications subject to user interaction and at what times and for what periods, and times in which applications receive updates (e.g., notifications). Computing device 100 may continually record power activity of the device until it is suspended (204). The device may be suspended for a variety of reasons, including, for example, by way of a period of inactivity (or idle time) or by manual user interaction. For example, a timer may activate when then device becomes idle. When the timer reaches a threshold period of time power regulator 116 may power down components of the device.

When suspension of the device is initiated, computing device initiates a sequence of activities in preparation of the suspension (206). Such activities may include storing a current geographic location, for example, a coordinate location received from location sensor 110. Computing device 100 may also store WLAN information for a currently connected WLAN, such as channel information, network identifiers, etc., and cellular network information for a currently connected cell site of a cellular network. Before the device is suspended, processor 102 may program sensor hub 118 to wake the device according to a stored device activity pattern (208). For example, the activity pattern may include the device normally becoming idle during a first period of time (e.g., between 11:00 and 11:15 pm, nightly) and waking up during a second period of time (e.g., between 6:30 and 7:00 am, daily). If the device goes idle, or is manually suspended, during the first period of time then processor 102 may program sensor hub 118 to wake at the start of or a predetermined period of time before the second period of time (e.g., at 6:20 am).

Once the current device settings are stored and sensor hub 118 has been programmed when to wake up, power to the components are suspended (210). As described previously, computing device 100 may suspend power to all device components except sensor hub 118 and motion sensor 112 and/or location sensor 110. Sensor hub 118 then uses a very low power to continuously monitor the sensor(s) for signals corresponding to the stored pattern (212). For example, if sensor hub 118 may monitor an internal clock and wake wireless network circuitry 106 at the programmed wake time (214). On activation, wireless network circuitry 106 may scan for a previously connected WLAN based on stored network parameters (216). If available (218), wireless network circuitry 106 connects to the WLAN and receive updates for applications operating on the device (220) and/or perform other housekeeping tasks to ready applications for expected user-interaction. If the previously connected WLAN is unavailable (e.g., the device has moved or channels and/or network identifiers of the WLAN have changed) then the sensor hub 118 may be configured to re-enter the suspend mode (222) and, for example, wait for manual user interaction. Additionally or in the alternative, sensor hub 118 may be configured to execute further processes to discover a new WLAN, for example, as described with regard to FIG. 3 and FIG. 4, below.

Figure 3:
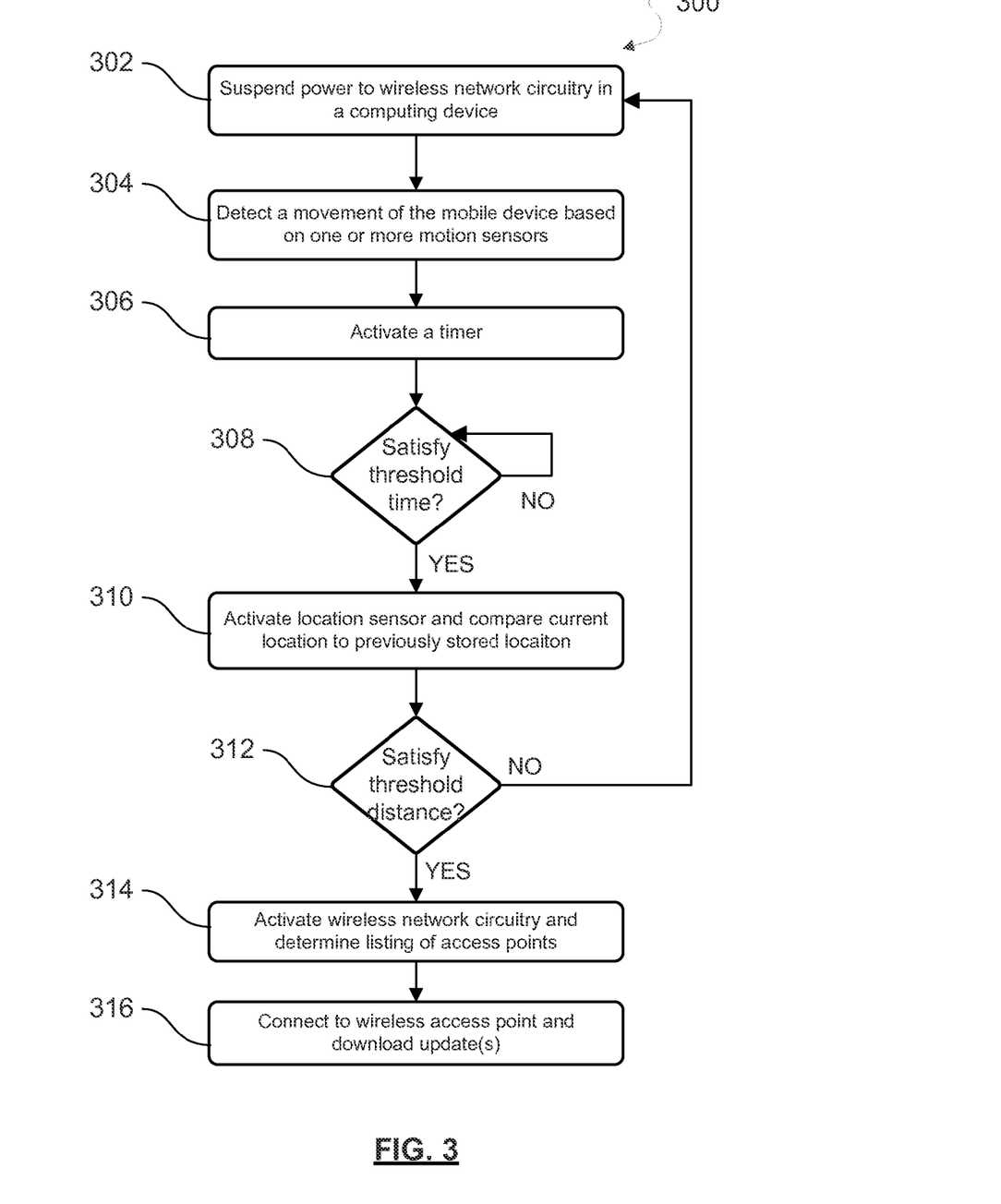
FIG. 3 depicts a flow diagram of a second example process for waking a computing device to update wireless connectivity.

FIG. 3 depicts a flow diagram of a second example process 300 for waking a computing device to update wireless connectivity according to aspects of the subject technology. For explanatory purposes, example process 300 is described herein with reference to the components of FIG. 1. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In the depicted example flow diagram, computing device 100 suspends power to wireless network circuitry in a mobile device (302). As described previously, the wireless network circuitry is configured to communicate with wireless access points for one or more local wireless networks, for example, using one or more IEEE (Institute of Electrical and Electronics Engineers) 802.11 protocols. In one or more implementations, power to most if not all user-interactive features of the mobile device are also suspended in connection with suspending power to the wireless network circuitry. For example, the device display screen, including the touch sensitivity of the display screen, may be powered down to conserve battery life.

While the wireless network circuitry (and other components) of the mobile device are powered down, computing device 100 is configured to detect a movement of the mobile device based on one or more motion sensors 112 in the mobile device (304). The movement may be, for example, detected by an accelerometer embedded within the device. Sensor hub 118 may be programmed to wake wireless network circuitry 106 in response to movements detected by the one or more motion sensors 112 that satisfy a threshold amount of movement. For example, only those movements that satisfy a predetermined amount of force and/or orientation may be significant enough to wake wireless circuitry 106. In some aspects, the movement and/or orientation must take place for a predetermined amount of time before sensor hub 118 sends the wake signal. In one example, sensor hub 118 is programmed to determine whether, based on the force, orientation, and duration of movement whether the device would have been moved far enough to enter the range of a new WLAN.

On the threshold amount of movement being detected, sensor hub 118 activates a timer while power to the wireless network circuitry remains suspended (306). The timer may be set based on a predetermined time period, or a stored pattern of user activity. For example, the stored activity of user-interaction may indicate that a user does not use the device until after a period of time that the device has been moved.

When the timer reaches a threshold period of time (308), a location sensor 110 is activated to read a current location of the mobile device while power to the wireless network circuitry is suspended (310). The current location is then compared to a location determined before power to the wireless network circuitry was suspended to determine whether the currently read location is a threshold distance from the previous location (312). Location sensor 110 may be a GPS radio that reads the current location of the mobile device using GPS. Accordingly, the current and previous locations may be GPS coordinates and the threshold distance may be a predetermined distance between GPS coordinates. In one or more implementations, the threshold distance may be based on a predetermined signal range of a wireless network access point connected to the mobile device before power to the wireless network circuitry was suspended.

If the comparison of locations does not satisfy the threshold distance (e.g., be greater than the distance), sensor hub 118 may resume the suspension of wireless network circuitry 106 (and other suspended components) (302). In one or more implementations, if the comparison of locations does not satisfy the threshold distance then sensor hub 118 may restart the timer (306) and perform another check when the timer satisfies the threshold period of time (308). Thus, if computing device 100 has not moved, there's no need to scan for different access points. Likewise, if computing device 100 has determined that no relevant access points are in the area the device may wake only after it determines that it moved.

If the comparison of locations satisfies the threshold distance, wireless network circuitry 106 may be activated and a current listing of wireless access points near the mobile device determined by the circuitry (314). In this example, the display of computing device (and other powered-down components) remains without power when the wireless network circuitry is activated and a current listing of wireless access points are determined. In this regard, when the device is woken up to a state to update notifications, it will be able to get online more quickly because it has an updated access point listing. This is advantageous because the device's access point listing will always have to be updated in order to connect to a new in-range network to receive updates and/or notifications.

In one or more implementations, once an access point has been identified, wireless network circuitry 106 may connect to the corresponding wireless local area network (WLAN), and receive one or more updates (or notifications) to one or more respective applications operating on the mobile device while power to the display is suspended (316, 220 of FIG. 2). Additionally or in the alternative, after determining the current listing of wireless access points, sensor hub 118 may be programmed to activate wireless network circuitry 106 at a predetermined time, the predetermined time being based on a history of user-interactions with the mobile device, as discussed above with regard to FIG. 2.

The activation of wireless network circuitry 106, update of access points, and updates to applications may be automatically performed by computing device 100 without user-interaction with any of the virtual features of the mobile device (e.g., user input via a touch screen, or activating the device by way of an activation button or swipe of the display screen).

Figure 4:
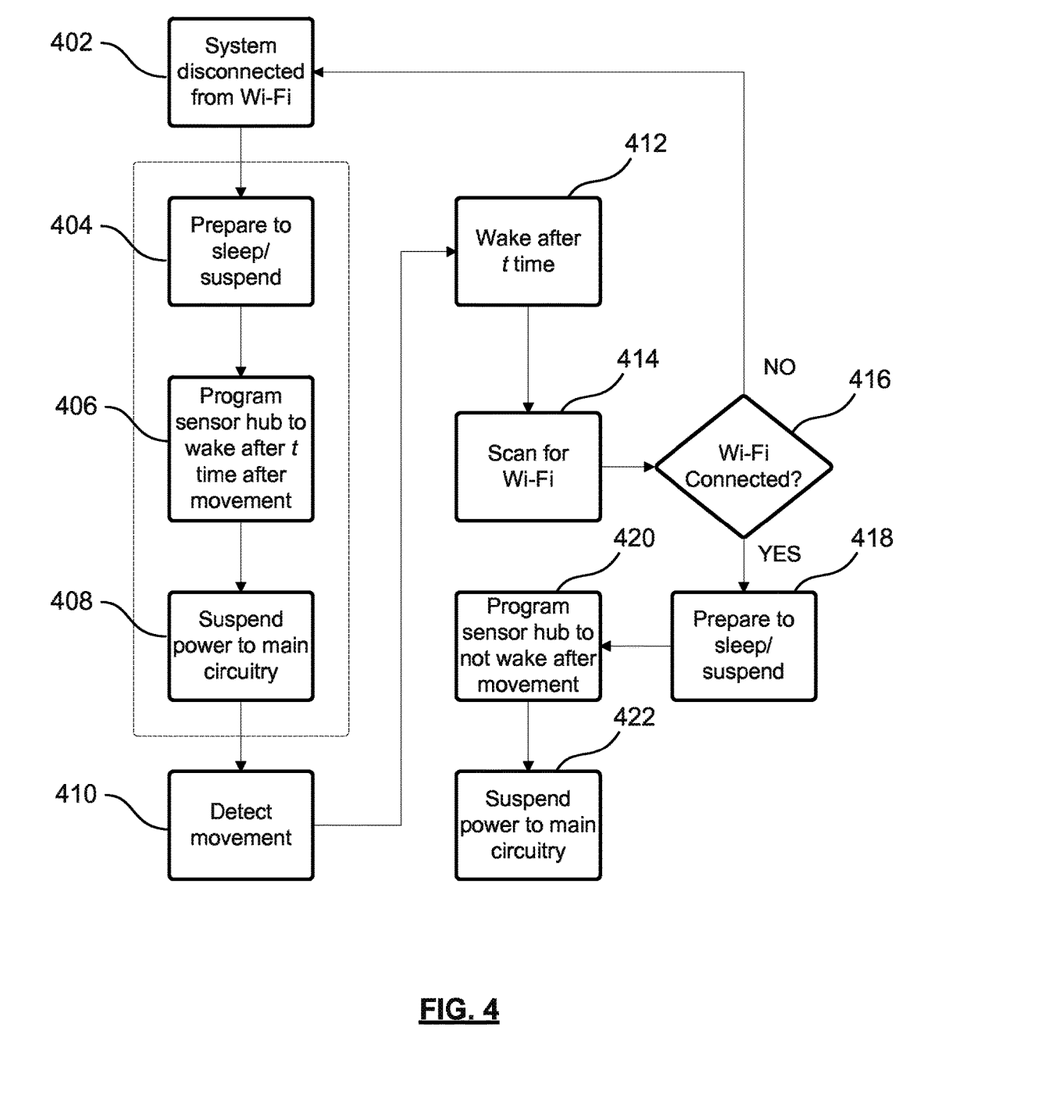
FIG. 4 depicts a flow diagram of a third example process for waking a computing device to update wireless connectivity.

FIG. 4 depicts a flow diagram of a third example process 400 for waking a computing device to update wireless connectivity according to aspects of the subject technology. For explanatory purposes, example process 400 is described herein with reference to the components of FIG. 1. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, computing device 100 determines that computing device 100 is not connected to any wireless local area network (WLAN) before power to the wireless network circuitry is suspended (402). Computing device 100 then goes to sleep in the usual manner, and prepares to suspend power to certain systems to conserve battery life (404). In the depicted example, computing device 100 sets the timer based on whether wireless connectivity (Wi-Fi) is enabled and whether the device is currently connected to a WLAN. Accordingly, since wireless connectivity is enabled and the device is not connected to a WLAN, the timer is set (406). Sensor hub 118 is then programmed to wake after a predetermined time t. The predetermined time may be based on factory settings, set by the user, or based on patterns of user interaction with the device. After the timer has been set, the device is placed in the suspended mode (408).

While the wireless network circuitry (and other components) of the mobile device are powered down, sensor hub 118 is configured to signal wireless network circuitry 106 to wake up when a threshold amount of movement of the mobile device is detected. Subsequently, motion sensor 112 detects the threshold amount of movement, and on the threshold amount of movement being detected, sensor hub 118 activates a timer while power to the wireless network circuitry is still suspended (412). When the timer reaches a threshold period of time, wireless network circuitry 106 is activated and the current geographical area wirelessly scanned to determine the availability of a WLAN (414). The scanning determines a current listing of wireless access points near the computing device 100.

In the depicted example, the wireless network circuitry 106 determines if it can connect to a WLAN (416). The connection may be to any publicly available connection (e.g., no key required) or a connection to which the computing device 102 has previously connected and has stored a network identifier and/or a key. WLANs within range of wireless network circuitry 106 may be scanned to determine if a WLAN includes a network identifier stored by computing device 102.

If no WLANs are available or wireless network circuitry 106 is otherwise unable to connect to a WLAN during the present wake cycle, sensor hub 118 prepares to suspend power to wireless network circuitry 106 and any other systems awakened during the present cycle (404) and instructs sensor hub 118 to wake up again after a predetermined time (406).

If a WLAN is available and wireless network circuitry can connect to it, wireless network circuitry 106 determines a current listing of wireless access points, the current listing of access points is stored (e.g., in sensor hub 118 or memory 104), and sensor hub 118 is programmed to not activate location sensor and/or wireless network circuitry on a future detection of movement of the mobile device (420), even after sensing a movement of the device that satisfies the threshold amount of movement. Power is then suspended to the wireless network circuitry and any other components that were awakened as described above (422).

The blocks of example process 400 may be combined with the blocks of process 200 and/or process 300. For example, the previously described scanning for WLANs (414) may be performed after it is determined that the device moved a predetermined threshold distance, as described with regard to blocks 308 to 312 of FIG. 3. Additionally or in the alternative, wireless network circuitry 106 may receive updates for applications operating on the device (220) before again being suspended as described with respect to blocks 420 and 422.

Many of the above-described example processes 200, 300 and 400, and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
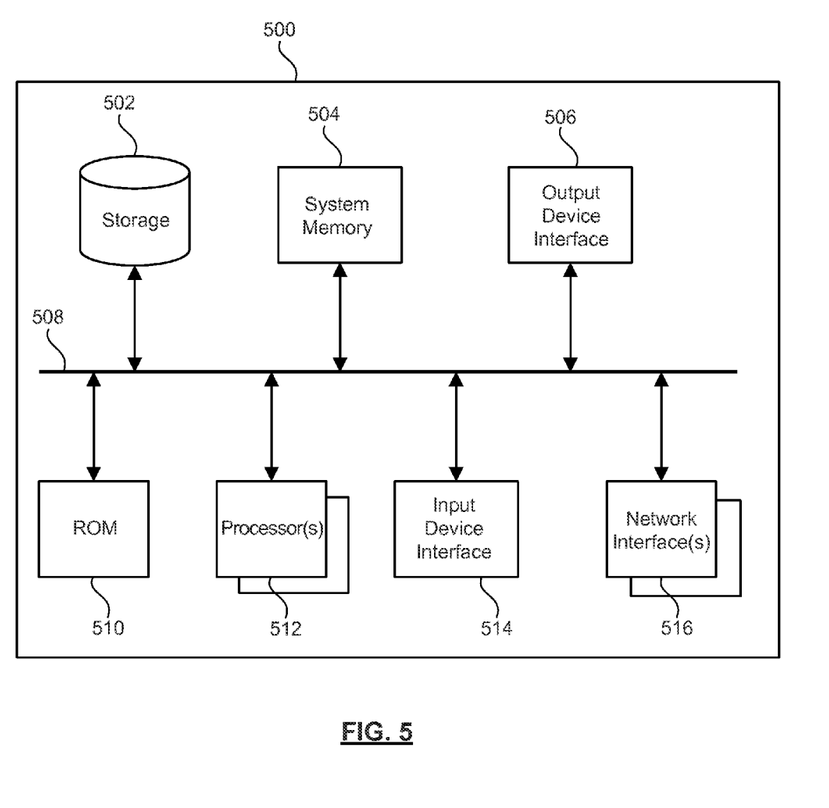
FIG. 5 is a diagram illustrating an example electronic system for use in connection with waking a computing device to update wireless connectivity.

FIG. 5 is a diagram illustrating an example electronic system 500 for use in connection with waking a computing device to update wireless connectivity, according to one or more aspects of the subject technology. Electronic system 500 may be a computing device for execution of software associated with the operation of computing device 100, or one or more portions or steps of process 200, 300 or 400, or components and processes provided by FIGS. 2-4. In various implementations, electronic system 500 may be representative of computing device 100. In this regard, electronic system 500 or computing device 100 may be a personal computer or a mobile device such as a tablet computer, laptop, PDA, or other touch screen or television with one or more processors embedded therein or coupled thereto, or any other sort of computer-related electronic device having wireless connectivity.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through network interfaces 516. Network interfaces 516 may include, for example, a wireless access point (e.g., Bluetooth or WiFi) or radio circuitry for connecting to a wireless access point. Network interfaces 516 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
    suspending power to wireless network circuitry in a mobile device, the wireless network circuitry configured to communicate with wireless access points for one or more wireless local area networks (WLANs);
    detecting a movement of the mobile device based on one or more motion sensors in the mobile device;
    activating, based on the detected movement, a location sensor in the mobile device to read a current location of the mobile device while power to the wireless network circuitry is suspended; and
    based on the current location being a threshold distance from a location determined before power to the wireless network circuitry was suspended, activating the wireless network circuitry and determining a current listing of wireless access points near the mobile device.

2. The computer-implemented method of claim 1, further comprising:
    activating a timer on detecting the movement, wherein the location sensor is activated when the activated timer reaches a predetermined threshold period of time since the movement was detected.

3. The computer-implemented method of claim 1, wherein detecting the movement comprises detecting a predetermined threshold amount of movement.

4. The computer-implemented method of claim 1, wherein the wireless network circuitry is activated without user-interaction with the mobile device.

5. The computer-implemented method of claim 1, wherein the wireless network circuitry is configured to communicate with the wireless access points using one or more IEEE (Institute of Electrical and Electronics Engineers) 802.11 protocols.

6. The computer-implemented method of claim 1, further comprising:
    suspending power to a display of the mobile device in connection with suspending power to the wireless network circuitry, wherein the display remains without power when the wireless network circuitry is activated; and
    determining a second current listing of wireless access points.

7. The computer-implemented method of claim 6, further comprising:
    connecting to a WLAN in connection with determining the second current listing of wireless access points; and
    receiving one or more updates to one or more respective applications operating on the mobile device while power to the display is suspended.

8. The computer-implemented method of claim 6, further comprising:
    determining that the mobile device is not connected to any WLAN before power to the wireless network circuitry is suspended;
    programming the mobile device to activate the location sensor when the movement is detected, wherein activating the location sensor is based on the mobile device not being connected to any WLAN before power to the wireless network circuitry is suspended;
    connecting to a WLAN in connection with determining the second current listing of wireless access points; and
    after determining the second current listing of wireless access points, storing the current listing, suspending power to the wireless network circuitry, and configuring the mobile device to not activate the location sensor and to not activate the wireless network circuitry on a future detection of movement of the mobile device.

9. The computer-implemented method of claim 8, further comprising:
    after determining the second current listing of wireless access points, configuring the mobile device to activate the wireless network circuitry at a predetermined time, the predetermined time being based on a history of user-interactions with the mobile device; and
    activating the wireless network circuitry at the predetermined time while power to the display is suspended.

10. The computer-implemented method of claim 1, wherein the location sensor reads the current location of the mobile device using a global positioning system (GPS) and the threshold distance is based on GPS coordinates.

11. A computer-implemented method, comprising:
    suspending power to wireless network circuitry in a mobile device, the wireless network circuitry configured to communicate with wireless access points for one or more wireless local area networks (WLANs);
    detecting a threshold amount of a movement of the mobile device based on one or more motion sensors in the mobile device while power to the wireless network circuitry is suspended;
    based on detecting the threshold amount of the movement, activating a timer while power to the wireless network circuitry is suspended; and
    based on a threshold period of time since the timer was activated, activating the wireless network circuitry and determining a current listing of wireless access points near the mobile device.

12. The computer-implemented method of claim 1, further comprising:
    activating, based on the threshold period of time, a location sensor to read a current location of the mobile device while power to the wireless network circuitry is suspended, wherein the wireless network circuitry is activated when the current location is a threshold distance from a location determined before power to the wireless network circuitry was suspended.

13. The computer-implemented method of claim 1, further comprising:
    suspending power to a display of the mobile device in connection with suspending power to the wireless network circuitry, wherein the display remains without power when the wireless network circuitry is activated; and determining a second current listing of wireless access points.

14. The computer-implemented method of claim 12, further comprising:
  connecting to a WLAN in connection with determining the current listing of wireless access points; and
  receiving one or more updates to one or more respective applications operating on the mobile device while power to the display is suspended.

15. The computer-implemented method of claim 11, wherein the wireless network circuitry is activated without user-interaction with the mobile device.

16. The computer-implemented method of claim 11, wherein the wireless network circuitry is configured to communicate with the wireless access points using one or more IEEE (Institute of Electrical and Electronics Engineers) 802.11 protocols.

17. The computer-implemented method of claim 11, further comprising:
  determining that the mobile device is not connected to any WLAN before power to the wireless network circuitry is suspended;
  programming the mobile device to activate the location sensor when the movement is detected, wherein activating the location sensor is based on the mobile device not being connected to any WLAN before power to the wireless network circuitry is suspended;
  connecting to a WLAN in connection with determining the current listing of wireless access points; and
  after determining the current listing of wireless access points, storing the current listing, suspending power to the wireless network circuitry, and configuring the mobile device to not activate the location sensor and to not activate the wireless network circuitry on a future detection of movement of the mobile device.

18. A computer-implemented method, comprising:
  suspending power to wireless network circuitry in a mobile device, the wireless network circuitry configured to communicate with wireless access points for one or more wireless local area networks (WLANs);
  determining a wake up time for the mobile device based on a history of user-interactions with the mobile device;
  activating, at the determined wake up time, a location sensor in the mobile device to read a current location of the mobile device while power to the wireless network circuitry is suspended; and
  based on the current location being a threshold distance from a location determined before power to the wireless network circuitry was suspended, activating the wireless network circuitry and determining a current listing of wireless access points near the mobile device, the wireless network circuitry being activated without user-interaction with the mobile device.

19. The computer-implemented method of claim 18, further comprising:
  suspending power to a display of the mobile device in connection with suspending power to the wireless network circuitry, wherein the display remains without power when the wireless network circuitry is activated; and
  determining a second current listing of wireless access points.

20. The computer-implemented method of claim 19, further comprising:
  connecting to a WLAN in connection with determining the second current listing of wireless access points; and
  receiving one or more updates to one or more respective applications operating on the mobile device while power to the display is suspended.

* * * * *